United States Patent [19]

Shizawa

[11] Patent Number: 4,507,255
[45] Date of Patent: Mar. 26, 1985

[54] PROCESS AND APPARATUS FOR INJECTION-MOLDING FOAMED ARTICLE

[75] Inventor: Masao Shizawa, Hiratsuka, Japan

[73] Assignee: Orion Kasei Kabushiki Kaisha, Hiratsuka, Japan

[21] Appl. No.: 480,607

[22] Filed: Mar. 30, 1983

[51] Int. Cl.³ ............................ B29D 27/00; B29F 1/03
[52] U.S. Cl. .................................... 264/45.1; 264/54;
264/328.17; 264/DIG. 83; 425/145; 425/166;
425/558; 425/573; 425/817 R
[58] Field of Search ................ 264/DIG. 83, 45.1, 54, 264/328.17; 425/145, 166, 558, 573, 817 R

[56] References Cited

U.S. PATENT DOCUMENTS

| | | | |
|---|---|---|---|
| 3,817,669 | 6/1974 | Buckner | 264/53 X |
| 3,966,372 | 6/1976 | Yasuike et al. | 264/DIG. 83 |
| 4,067,673 | 1/1978 | Hendry | 264/DIG. 83 |
| 4,134,687 | 1/1979 | Eckardt | 264/DIG. 83 |
| 4,155,969 | 5/1979 | Hendry | 264/DIG. 83 |
| 4,255,367 | 3/1981 | Wallace et al. | 264/DIG. 83 |

FOREIGN PATENT DOCUMENTS

2500972  7/1976  Fed. Rep. of Germany ... 264/DIG. 83

Primary Examiner—Philip Anderson
Attorney, Agent, or Firm—Jordan and Hamburg

[57] ABSTRACT

A process and apparatus for injection-molding a foamed article including a foamed core and an outer solid skin layer of unfoamed synthetic resin are provided. A first molten flow of the unfoaming synthetic resin is at first injected into a mold to form the outer solid skin layer. Subsequently, a second molten flow of a synthetic resin containing a foaming agent is fed into the first molten flow without stopping the first flow and is then mixed and kneaded to form a kneaded mass. The kneaded mass is then injected into the mold to form the core portion. Since the first flow is continuously fed during one operation cycle, the product molded article has no hesitation marks.

16 Claims, 5 Drawing Figures

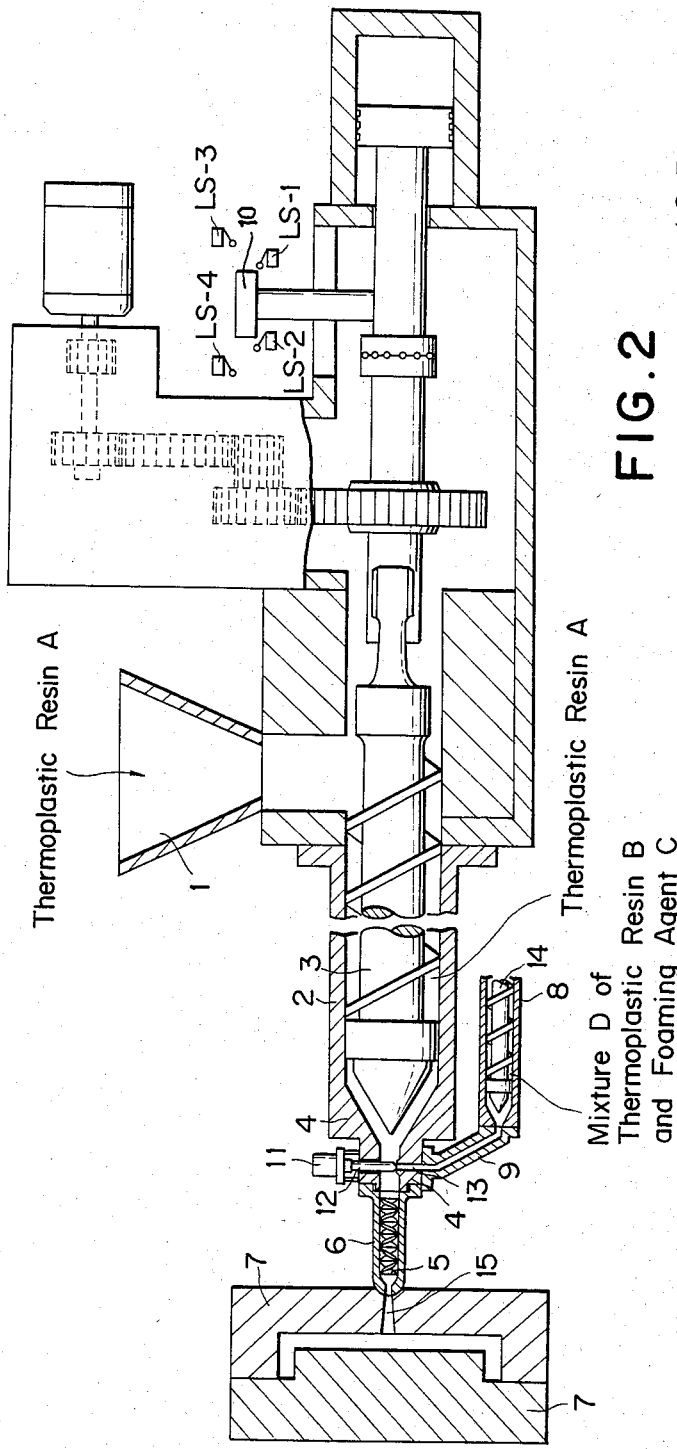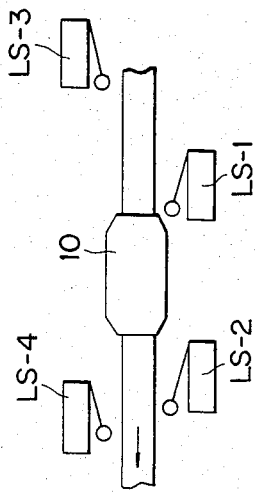

PROCESS AND APPARATUS FOR INJECTION-MOLDING FOAMED ARTICLE

BACKGROUND OF THE INVENTION

1. Field of the Invention

The present invention relates to a process and an apparatus for injection-molding a foamed article, and particularly to an injection-molding process and apparatus for preparing a foamed article including a foamed core and an outer or external solid skin layer of unfoamed material.

2. Prior Art

The products of synthetic resin prepared through the known structural foam processes are generally characterized by excellent rigidity, and sound-insulating and heat-insulating capacities, together with easy moldability for the preparation of a variety of molded products having different shape and density. However, the known processes of such kind have a disadvantage that eddy or swirling patterns which would impair the visual appearance of the products are formed on the surfaces thereof due to foaming to necessitate the surface coating of the products in some cases. In order to eliminate this disadvantage, there have hitherto been developed a variety of structural foam processes and apparatuses used therefor. In one of the previously developed process, a pair of injection molding units having the same capacity is used, one of which units contains a synthetic resin for forming the outer skin layer of the product and the other of which units contains another synthetic resin for forming the core or internal foamed body of the product, and the units are operated such that the said two kinds of synthetic resins are alternately injected, for example by switching a changeover valve assembled therewith, into a mold. In this known process, a first synthetic resin injected into the cavity of the mold from the first unit through the gate of the mold contacts with the walls defining the cavity to be lowered in temperature with attendant increase in its viscosity to stagnate on the walls at the vicinity of the gate, and the following first synthetic resin mass successively fed through the gate of the cavity passes through the internal portion of the precedingly-injected first resin and then stagnates on the deeper wall portions, in other words, on the wall portions spaced at a greater distance from the gate of the cavity. During one cycle injection operation, the aforementioned successive stagnation of the continuously injected first resin material is repeatedly and continuously effected to fill the cavity. Then the change-over valve is switched to inject a second synthetic resin for forming the internal foamed body through the gate of the cavity to fill the molded body internally of the layer formed by the said first synthetic resin.

However, the viscosities of the injected first and second resins must be maintained at constant values and also the first and second resins must be injected at constant rates, in order to effect the aforementioned operations to agree with the theoretical assumption. However, in this known process, since two different resins of different state are injected through the pair of two injection units, it is extremely difficult to inject both resins while allowing them to have uniform fluidity or viscosity to effect continuous and stable injection. As a result of the switching of the valve for the alternate injections of the first and second resins, a hesitation mark, i.e. an interruption line of swirling form, is formed, or the foamed body tends to be exposed on the surface of the molded product in case where a molded product having a relatively complicated shape is molded, or a disadvantage is induced such that the foamed body does not extend to the portion remotest from the gate of the cavity.

Another known process involves an improvement in construction of the extruder for passing the molten resins onto the mold mounted on the injection molding machine, wherein the first synthetic resin for forming the outer skin layer is fed through the outer peripheral portion of the extruder and the second synthetic resin for forming the inner foamed core portion or body is fed through the inner or central portion of the extruder, whereby the first and second synthetic resins are injected into the mold simultaneously. However, the properties of the first and second synthetic resins used in this known process are different from each other, leading to a disadvantageous result that the second synthetic resin tends to be exposed on the surface of the molded product or the first and second synthetic resins are mingled or mixed at the injection step to make the process inoperative. Anyway, there has not been known or realized in the art a simple process for the production of excellent molded article composed of an outer solid or rigid skin layer surrounding an inner foamed core body.

OBJECTS AND SUMMARY OF THE INVENTION

A primary object of the present invention is to provide an injection-molding process and apparatus for the preparation of a molded article of synthetic resin having a smooth finished surface and including an inner body or core made of a foamed synthetic resin and an outer skin layer made of a solid or unfoaming synthetic resin.

Another object of the invention is to provide a simple and efficient injection-molding process and apparatus for the preparation of a foamed article having a smooth finished surface free of interruption or hesitation line and made of an outer solid or rigid skin layer surrounding an inner foamed core or body portion.

A further object of the invention is to provide an injection-molding process and apparatus for the preparation of a foamed article including an internal foamed body or core and an outer skin layer of unfoaming resin material without the risk that a portion of the foamed body is exposed onto the surface of the finished product even when the article is of complicated shape.

A still further object of the invention is to provide an automation apparatus for injection-molding automatically a molded article having an excellent finished surface made of an outer skin layer of unfoaming synthetic resin material surrounding an inner foamed body or core.

The above and other objects and advantages of the invention will become apparent from the following detailed description of the invention.

To attain the aforementioned objects, the present invention provides an injection-molding process for the preparation of a molded article of synthetic resins, said molded article including a core made of a foamed material and an outer skin layer made of an unfoaming synthetic resin, comprising:

(a) the step of continuously supplying and injecting a first molten flow of said unfoaming synthetic resin into a mold to form said outer skin layer;

(b) the step of subsequently feeding a second molten flow of a synthetic resin miscible with said unfoaming synthetic resin and containing a foaming agent into said first molten flow of said unfoaming synthetic resin without stopping supplying said first molten flow:

(c) the step of mixing and kneading said unfoaming synthetic resin with said synthetic resin containing said foaming agent to form a kneaded mass; and (d) the step of injecting said kneaded mass into said mold to form said core.

According to another aspect of the present invention, there is provided an injection-molding apparatus for molding a molded article of synthetic resins, said molded article including a core made of a foamed material and an outer skin layer made of an unfoaming synthetic resin, comprising: (a) means for supplying a first molten flow of said unfoaming synthetic resin to continuously inject the same into a mold to thereby form said outer skin layer; (b) means for feeding a second molten flow of a synthetic resin miscible with said unfoaming synthetic resin and containing a foaming agent into said first molten flow of said unfoaming synthetic resin without stopping supplying said first molten flow; (c) control means for controlling said second molten flow of said synthetic resin containing said foaming agent; and (d) means for mixing and kneading said unfoaming synthetic resin with said synthetic resin containing said foaming agent to then pass the resultant mixed and kneaded composition into said mold to form said core.

BRIEF DESCRIPTION OF THE DRAWINGS

FIG. 1 is a diagrammatical sectional view, partly broken away, of an embodiment of the apparatus according to the present invention showing principal parts thereof;

FIG. 2 is a schematic view showing the arrangement of limit switches of the apparatus shown in FIG. 1.

PREFERRED EMBODIMENTS OF THE INVENTION

Figure 3:
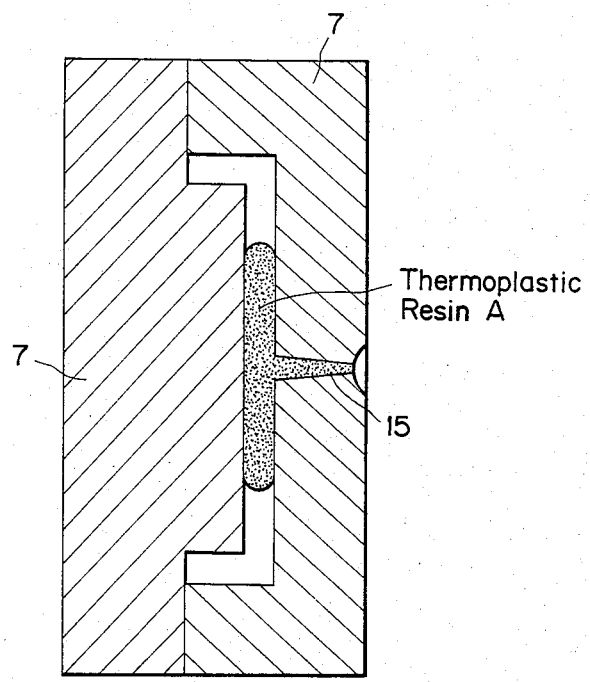
FIGS. 3 to 5 are diagrammatical sectional views each showing a flow of resin injected into the cavity of a mold in accordance with the process and apparatus of the present invention.

An embodiment of the present invention will be described in detail with reference to the appended drawings. Firstly referring to FIG. 1, a thermoplastic resin A is supplied from a hopper 1 into a cylinder 2 which contains a retractable feed screw 3 to be rotated by a motor (not shown) and a speed change gearing (not shown) combined with the motor. The cylinder 3 has a cylinder head 4 including an outlet port of said cylinder 3. A mold 7 for receiving a molten resin flow to mold an article of thermoplastic resin is attached in front of the cylinder head 4. A mixing nozzle 6 containing therein a static mixer having right-hand and left-hand screw elements is interposed between the cylinder head 4 and the mold 7. The thermoplastic resin A is melted in the cylinder 2 and transferred therethrough by the action of the retractable screw 3 to be injected in the cavity of the mold 7. In the illustrated embodiment, another sub-cylinder 8 having an injection capacity of from 3 to 20% by volume, preferably 5 to 10% by volume, of that of the cylinder 2 is connected through a connection tube 9 to the cylinder head 4. A mixture D containing a thermoplastic resin B and a foaming agent C is fed from a hopper (not shown) into the sub-cylinder 8 and then passed therethrough by the action of a screw 14 or any other suitable means into the cylinder head 4 of the cylinder 2. It should be noted here that the term "cylinder head" used herein means a portion including a fore end or outlet port of the cylinder 2 in which the feed screw 3 is arranged. FIGS. 1 and 2 show, in somewhat diagrammatical illustration, a control system for controlling an intermittent feeding of the mixture D from the sub-cylinder 8 at any desired timings for feeding and subsequently stopping the feed of the mixture D into the molten flow of the resin A during each injection molding cycle. The control system is provided at the upstream of the mixing nozzle 6. The control system comprises, for example, limit switches LS-1 to LS-4 cooperatively associated with cam means 10, a hydraulically operated cylinder 11 and a needle valve 12, and operates to control the feed of mixture D from the sub-cylinder 8 through the connection tube 9 associated therewith by opening and closing the needle valve 12 at controlled timings.

The injection-molding process for the preparation of a molded article having a foamed core portion will now be described. A thermoplastic resin A is supplied from the hopper 1 into the main cylinder 2, and a mixture D essentially consisting of a thermoplastic resin B and a foaming agent C is fed into a separate and smaller capacity sub-cylinder 8. The thermoplastic resins A and B may be the same and may be any of polyethylene, polypropylene, ABS resins, modified polyphenyleneoxides (such as a commercially available product produced and sold under the Trade Name of "NORYL" from General Electric Co.), grafted polyphenylene ethers (such as a commercially available product produced and sold under the Trade Name of "XYRON" from Asahi Chemical Industries Co., Ltd.), polyamides including 6-nylon and 6,6-nylon, and polycarbonate. The thermoplastic resins A and B must be miscible with each other in the molten state, and may be the same kind of resin or different kinds of resin. The combination of resins A and B miscible with each other include, for example, a combination of polyethylene with polypropylene, an ABS resin with polystyrene, a modified polyphenyleneoxide with polystyrene, a grafted polyphenylene ether with polystyrene, 6,6-nylon with 6-nylon and polycarbonate with an ABS resin. Examples of the foaming agent C added to the thermoplastic resin B to form a foamable mixture D include azodicarbonamide (ADCA), azobisisobutylonitrile (AZDN), p,p'-oxybisbenzenesulfonylhydrazide (OBSH), N,N'-dinitrosopentamethylenetetramine (DPT) and p-toluenesulfonylsemicarbazide (TSSC).

The thermoplastic resin A supplied in the cylinder 2 is injected or shot from the cylinder head 4 through the mixing nozzle 6 by the action of the screw 3 rotated in the direction for forwarding the molten resin into a cavity of the mold 7 through a sprue 15, as shown in FIG. 3. A pre-set volume of the resin A is injected at each molding operation cycle.

In order to control each operation cycle, the cam means 10 disposed at the aft portion of the screw 3 is contoured so that it abuts against the limit switch LS-3 to start the molding operation and is then advanced towards the limit switch LS-1 as the screw 3 moves forwards. During the operation time until the cam means 10 reaches the position at which it abuts against the limit switch LS-1, the needle valve 12 assembled in the hydraulic cylinder 11 closes an outlet port 13 of the connection tube 9. The outlet port 13 is opened to the cylinder head 4 and is communicated with the internal region of the cylinder head 4 positioned at the upstream of the mixing nozzle 6, at which region the main cylinder 2 and the sub-cylinder 8 is conjoined together through the connection tube 9, as shown in FIG. 1. The screw 3 moves forwards to allow the cam 10 to abut against the limit switch LS-1, whereupon the hydraulic cylinder is released to allow the needle valve 12 to be unseated from the outlet port 13 and concurrently the sub-screw 14 begins to move forwards to feed the mixture D of the thermoplastic resin B and the foaming agent C into the flowing mass of molten resin A flowing through the cylinder head 4. The mixture D thus shot into the molten mass of the flowing resin A is mixed with the latter in the mixing nozzle 6 and then injected into the molding cavity of the mold 7 through the sprue 15.

Figure 4:
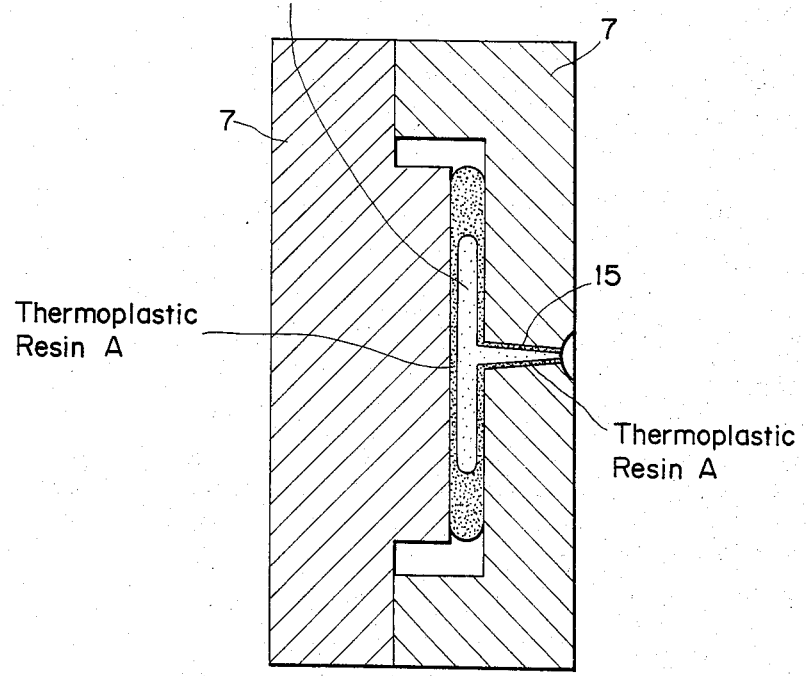
Figure 5:
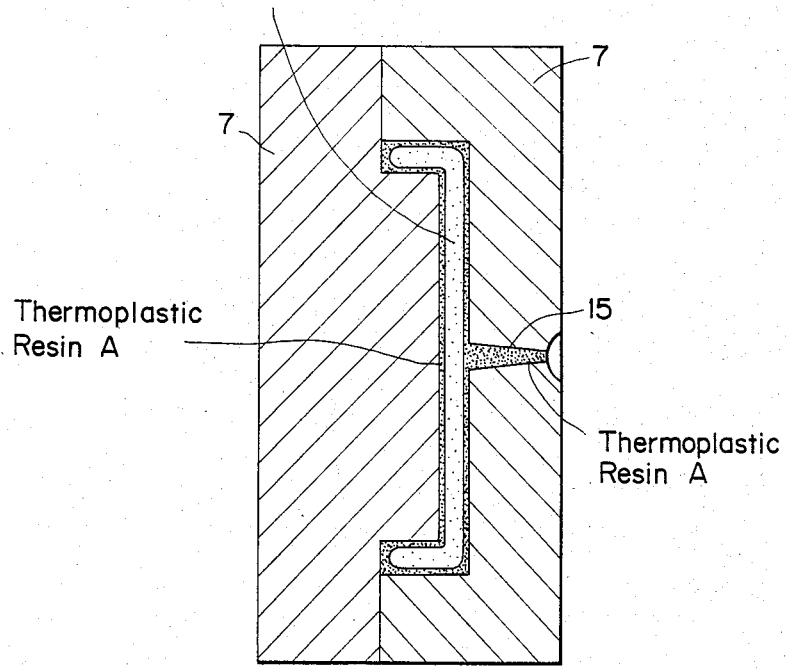

It is desirous that the amount of the foaming agent C present in the mixed resinous materials including the miscible thermoplastic resins A and B ranges such that 0.2 to 0.8 parts, by weight, of the foaming agent C is contained in 100 parts, by weight, of the mixed resinous materials. Since the rational volume of the mixture D to be admixed to and kneaded with the thermoplastic resin A to form a kneaded mass is relatively small as compared with the volume of the resin A, as will be apparent from the examples given hereinafter, and the mixture D is intimately mixed with the resin A by means of the mixing nozzle 6, the viscosity of the kneaded mass is substantially the same as or only slightly different from the viscosity of the molten resin A, whereby the kneaded mass flows through the internal portion of the precedingly shot thermoplastic resin A and is injected into the mold 7 to form a foamed core body including a number of fine closed cells of bubble-like voids, as shown in FIG. 4. Then, the screw 3 moves further to allow the cam 10 to abut against the limit switch LS-2, whereupon the sub-screw 14 is stopped so that the feed of the mixture D into the cylinder head 4 is stopped and concurrently the needle valve 12 is seated on to close the outlet port 13 by the actuation of the hydraulic cylinder 11 thereby to allow only the thermoplastic resin A to be injected into the mold 7 after then. Thus, the one cycle molding operation is completed by the subsequent injection of the thermoplastic resin A to fill the internal cavity of the mixing nozzle 6 and the sprue 15 singly with the resin A. At the termination of one cycle molding operation, the cam means 10 abuts against the limit switch LS-4 to rotate the screw 3 in the reverse direction for retracting the screw 3 until the cam means is moved back to the initial stage at which it abuts against the limit switch LS-3.

In the process of the present invention, the mixture contained in the sub-cylinder 8 may be fed or shot into the flowing mass transferred from the main cylinder 2 at any desired timing, while the resin contained in the main cylinder 2 is continuously supplied and passed to the cylinder head 4 without the interruption of its supply throughout the overall unit operation cycle. Accordingly, the foamed product prepared in accordance with the process of this invention has an internal foamed core made of a foamable synthetic resinous composition fully covered with a skin layer made of an unfoaming synthetic resin and free from defects, such as hesitation marks formed by the interruption of the resin supply in the mold cavity. A molded article having a center or core portion made of foamed material can be prepared by the use of a simple and easily operable molding apparatus, so that a product having beautiful appearance, improved rigidity and excellent sound-insulating and heat-insulating properties can be prepared by the invention.

EXAMPLES OF THE INVENTION

The present invention will be described more specifically by referring to examples thereof.

EXAMPLE 1

A main cylinder having an injection capacity of 3600 g and a sub-cylinder having an injection capacity of 200 g were used.

A polystyrene was supplied into the cylinder, and a mixture prepared by mixing the components in the ratio as set forth below was supplied in the sub-cylinder.

Composition of the Mixture Supplied into the Sub-Cylinder:

| | | |
|---|---|---|
| Polystyrene (Trade Name: DIAREX HT-59; available from Mitsubishi Monsant Chemical Co., Ltd.) | 100 wt % | 170 grams |
| Azodicarbonamide (Foaming Agent) | 6 wt % | |

Using the starting materials as aforementioned, a molded article including foamed core portion was produced according to the process of the invention as described hereinbefore.

Shape: Box
Weight: 1980 grams
Average Wall Thickness: 7 mm
Thickness of the Skin Layer Resin: 1.2 to 1.6 mm
Thickness of the Core: 3.8 to 4.6 mm (The core was formed by a uniformly foamed body.)

The thus molded article produced in accordance with the structural foam process of the present invention has a smooth surface free of any eddy patterns or striae and has a good appearance, excluding the necessity of surface coating otherwise necessary for the molded articles prepared through the known structural foam process.

EXAMPLE 2

Using the same apparatus and the same mold as used in Example 1, a modified polyphenyleneoxide (Trade Name: NORYL FN-215, available from General Electric Co.) was supplied in the main cylinder, and the following mixture prepared by mixing the composition as set forth below in the specified ratio was supplied into the sub-cylinder.

Composition of the Mixture Supplied into the Sub-Cylinder:

| | | |
|---|---|---|
| Polystyrene: (Trade Name: DIAREX HF77) | 100 wt % | 130 grams |
| Azodicarbonamide (Foaming Agent) | 10 wt % | |

The resultant molded article has an appearance, similar to that of the product obtained in Example 1, free of eddy patterns or striae and has a surface excluding the necessity of coating.

Although the present invention has been described with reference to the preferred embodiments and the Examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. An injection-molding process for the preparation of a molded article of synthetic resins, said molded article including a core made of a foamed material and an outer skin layer made of an unfoaming synthetic resin, comprising:
   (a) the step of continuously supplying and injecting a first molten flow of said unfoaming synthetic resin into a mold to form said outer skin layer;
   (b) the step of subsequently feeding a second molten flow of a synthetic resin miscible with said unfoaming synthetic resin and containing a foaming agent into said first molten flow of said unfoaming synthetic resin without stopping supplying said first molten flow;
   (c) the step of mixing and kneading said unfoaming synthetic resin with said synthetic resin containing said foaming agent to form a kneaded mass; and
   (d) the step of injecting said kneaded mass into said mold to form said core.

2. The process as claimed in claim 1, wherein said second molten flow is fed in a rate such that 3 to 20 parts, by volume, of said second molten flow is mixed with 100 parts, by volume, of said first molten flow at said step (b).

3. The process as claimed in claim 1, wherein said synthetic resin forming said first molten flow and said synthetic resin containing said foaming agent and forming said second molten flow are the same resin and selected from the group consisting of polyethylene, polypropylene, polystyrene, ABS resins, modified polyphenyleneoxides, grafted polyphenylene ethers, polyamides and polycarbonate.

4. The process as claimed in claim 1, wherein said synthetic resin forming said first molten flow is different from said synthetic resin containing said foaming agent and forming said second molten flow, and wherein the combination of the former-mentioned synthetic resin and the latter-mentioned synthetic resin is selected from the group of combinations consisting of polyethylene and polypropylene, an ABS resin and polystyrene, a modified polyphenyleneoxide and polystyrene, a grafted polyphenylene ether and polystyrene, 6,6-nylon and 6-nylon, and polycarbonate and an ABS resin.

5. The process as claimed in claim 1, wherein said foaming agent is selected from the group consisting of azodicarbonamide, azoisobutylonitrile, p,p'-oxybisbenzenesulfonylhydrazide, N,N'-dinitrosopentamethylenetetramine and p-toluenesulfonylsemicarbazide.

6. The process as claimed in claim 1, wherein the amount of said foaming agent contained in said second molten flow ranges from 0.2 to 0.8 parts, by weight, based on 100 parts, by weight, of the total weight of said synthetic resin forming said first molten flow and said synthetic resin contained in said second molten flow fed during said step (b).

7. The process as claimed in claim 1, further comprising the step of stopping the feed of said second molten flow after said step (d), while continuing supply of said first molten flow.

8. An injection-molding apparatus for molding a molded article of synthetic resins, said molded article including a core made of a foamed material and an outer skin layer made of an unfoaming synthetic resin, comprising:
   (a) means for supplying a first molten flow of said unfoaming synthetic resin to continuously inject the same into a mold to thereby form said outer skin layer;
   (b) means for feeding a second molten flow of a synthetic resin miscible with said unfoaming synthetic resin and containing a foaming agent into said first molten flow of said unfoaming synthetic resin without stopping supplying said first molten flow;
   (c) control means for controlling said second molten flow of said synthetic resin containing said foaming agent; and
   (d) means for mixing and kneading said unfoaming synthetic resin with said synthetic resin containing said foaming agent to then pass the resultant mixed and kneaded composition into said mold to form said core.

9. The apparatus as claimed in claim 8, wherein said means (a) for supplying said first molten flow comprises a cylinder, and retractable screw means contained in said cylinder for passing said first flow to an outlet port of said cylinder.

10. The apparatus as claimed in claim 8, wherein said means (b) for feeding said second molten flow comprises a cylinder, and retractable screw means contained in said cylinder for shooting said second molten flow into said first molten flow.

11. The apparatus as claimed in claim 8, wherein said control means (c) comprises an opening and closing valve associated with said means (b), said valve controlling the feed of said second molten flow of said synthetic resin containing said foaming agent, and actuator means for opening or closing said opening and closing valve.

12. The apparatus as claimed in claim 8, wherein said means (d) for mixing and kneading said synthetic resin containing said foaming agent comprises a mixing nozzle including therein a static mixer.

13. The apparatus as claimed in claim 8, wherein said means (a) for supplying said first molten flow comprises a cylinder, a retractable screw contained in said cylinder for passing said first molten flow to an outlet port of said cylinder, and cam means co-operated with said retractable screw means; wherein said control means (c) comprises an opening and closing valve associated with said means (b) for controlling the feed of said second molten flow of said synthetic resin containing said foaming agent, and actuator means for opening or closing said opening and closing valve; and wherein there is further included automatic control means for controlling said opening and closing valve while co-operating with said cam means and said actuator means.

14. The apparatus as claimed in claim 13, wherein said automatic control means comprises limit switches operatively associated with said cam means to electrically energize or de-energize said actuator means thereby to control the opening and closing operations of said opening and closing valve.

15. The apparatus as claimed in claim 8, wherein a hopper is assembled with said means (a) for supplying said first molten flow, said hopper storing said unfoaming synthetic resin.

16. The apparatus as claimed in claim 8, wherein a hopper is assembled with said means (b) for feeding said second molten flow, said hopper storing said synthetic resin containing said foaming agent.

* * * * *